C. E. CROOKS.
AXLE SPLICE.
APPLICATION FILED MAY 16, 1918.
1,289,121.
Patented Dec. 31, 1918.
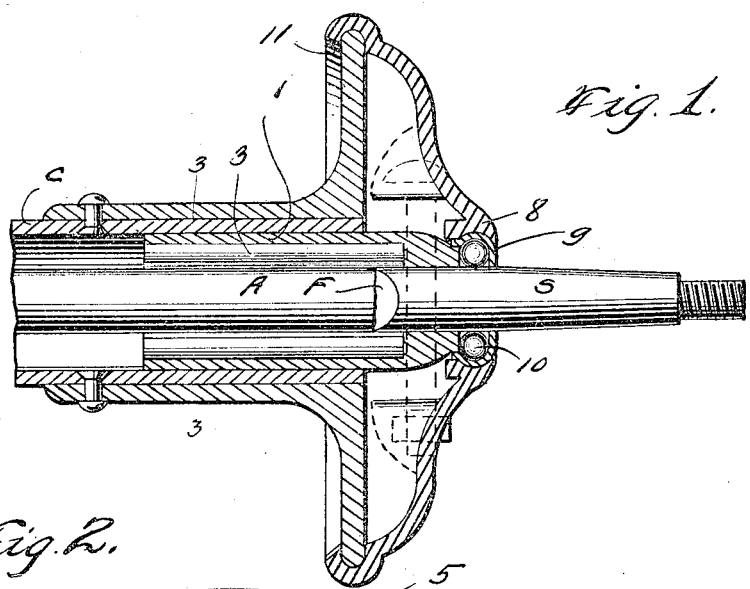
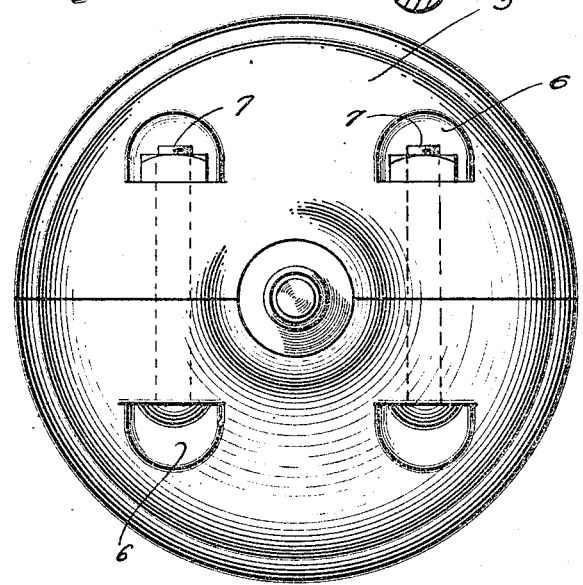
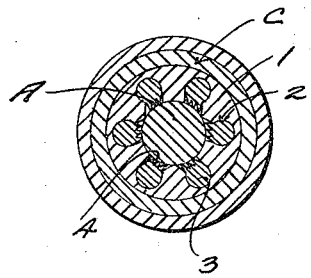
INVENTOR
Charles E. Crooks
WITNESSES
BY
ATTORNEY

UNITED STATES PATENT OFFICE.

CHARLES E. CROOKS, OF RINARD, ILLINOIS.

AXLE-SPLICE.

1,289,121.         Specification of Letters Patent.      Patented Dec. 31, 1918.

Application filed May 16, 1918.   Serial No. 234,976.

*To all whom it may concern:*

Be it known that I, CHARLES E. CROOKS, a citizen of the United States, residing at Rinard, in the county of Wayne and State of Illinois, have invented certain new and useful Improvements in Axle-Splices, of which the following is a specification.

This invention relates to axles for use in motor vehicles, and more especially to means for repairing the same by a splice when it becomes broken on the road.

The primary object of the invention is to produce an attachment, especially useful for the drivers of Ford cars, whereby an axle broken at the point between its body and its spindle may be spliced, and the driver can proceed on his way.

This object is carried out by the means set forth in the following specification and claims, and shown in the drawings wherein:—

Figure 1 is a vertical sectional view through the outer end of the axle casing and housing, showing this splice in place on a broken axle bar, Fig. 2 is an outer end elevation, viewing the device from the right of Fig. 1, Fig. 3 is a cross section on the line 3—3 of Fig. 1.

Assuming that this is the axle of a Ford car, A is the body of the axle proper, S its spindle, and F the fracture which usually occurs between these parts or at their juncture. C is the axle casing and H is the housing at its outer end. The bearings for the axle are not shown, as they have been removed.

The attachment comprises a relatively long tubular element or sleeve 1 having around its bore and communicating therewith a series of longitudinal channels indicated at 2 in Fig. 3, and within these channels pawls 3 preferably mounted for rotation to a slight degree, each having at its inner or active side a series of biting teeth 4, and the teeth of three of the pawls inclined reversely to the teeth of the remaining three (assuming that there are six of them). The channels 2 extend from the inner end of the sleeve nearly to its outer end, and the pawls should be of a considerable length as seen in Fig. 1 so that they will lap the fracture F in the axle, wherever it occurs. The outer end of the sleeve is reduced to fit rather closely around the spindle, and furthermore to prevent the possible loss of the pawls. This element of my attachment is passed over the spindle and driven onto the axle, the ball bearings having first been removed.

The numeral 5 designates a cupped disk made in two parts or halves as best seen in Fig. 3. Each half is indented as shown at 6, with one wall of each indentation standing in a horizontal plane, and through a perforation in this wall and a similar perforation in the corresponding wall of the indentation of the other half of the disk, is passed a bolt 7, the two bolts holding the parts together as seen in Fig. 2. The center of the disk is shaped as shown at 8 to inclose a ball retainer 9, and the latter in turn contains a series of balls 10 bearing against the outer end of the sleeve 1 which of course rotates with the axle, whereas the disk and the retainer 9 remain stationary.

With an attachment of this kind carried in the tool box, a Ford owner may very quickly repair an axle in case it should become fractured at substantially the point indicated in Fig. 1. He first removes the wheel and withdraws the ball bearings, then he drives the sleeve 1 and its pawls onto the axle astride or lapping the fracture F, and finally he applies the two-part disk with its balls in their race or retainer 9, and connects the parts by the bolts or by any other equivalent means. The strain of the load is not thrown to a great extent on the journal, since the ball bearing in the attachment carries it to the housing H of the casing C. The peculiar disposition of the teeth 4 of pawls 3 causes them to bite into the axle A and to lock the sleeve upon it against rotation in either direction, and therefore one attachment is applicable to either end of the driving axle.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. The herein described axle splice comprising a sleeve having a plurality of longitudinal channels, substantially cylindrical in contour and opening into its bore, and a series of pawls whose bodies are rotatably mounted within said channels and provided with biting teeth projecting slightly into said bore, some of the teeth inclining in one direction and some in the other, as and for the purpose set forth.

2. The herein described splice for a broken axle, the same comprising a sleeve whose bore is adapted to surround the axle and its fracture, a cupped disk for attachment to the axle casing housing, and a ball bearing between the outer end of the sleeve and the center of said disk, as and for the purpose set forth.

3. The herein described Ford axle splice, the same comprising a sleeve whose bore is adapted to surround the axle where fractured, means therein for preventing the rotation of the axle within the sleeve, the outer end of the latter being reduced for inclosing the axle spindle, a ball race, a series of balls therein resting against the outer end of said sleeve, and a support for said race connected with the housing of the axle casing.

4. The herein described Ford axle splice, the same comprising a sleeve whose bore is adapted to surround the axle where fractured, means therein for preventing the rotation of the axle within the sleeve, the outer end of the latter being reduced for inclosing the axle spindle, a ball race, a series of balls therein, and a cupped disk whose center incloses said ball race and whose periphery is adapted for attachment to the housing of the axle casing.

5. In a Ford axle splice, the combination with a sleeve adapted for close application to the axle so as to embrace the fracture thereof, and a ball bearing at the outer end of the sleeve for inclosing the axle-spindle; of a two-part cupped disk whose periphery is adapted for inclosing the housing of the axle casing and whose center is adapted for carrying one part of said ball-bearing, and detachable connections between the parts of said disk, for the purpose set forth.

6. In a Ford axle splice, the combination with a sleeve adapted for close application to the axle so as to embrace the fracture thereof, and a ball bearing at the outer end of the sleeve for inclosing the axle-spindle; of a two-part cupped disk whose periphery is adapted for inclosing the housing of the axle casing and whose center is adapted for carrying one part of said ball-bearing, each part of the disk being indented and the walls of the indentations in one part facing those of the other and provided with perforations, and a pair of bolts through the respective perforations in said walls, for the purpose set forth.

In testimony whereof I affix my signature in presence of two witnesses.

CHARLES E. CROOKS.

Witnesses:
ALLEN E. MICHELS,
GROVER C. PHILLIPS.

Copies of this patent may be obtained for five cents each, by addressing the "Commissioner of Patents, Washington, D. C."